United States Patent [19]
Stewart

[11] Patent Number: 5,159,744

[45] Date of Patent: Nov. 3, 1992

[54] TOOLS FOR REPAIRING PLANETARY GEARS

[76] Inventor: Matthew M. Stewart, 9794 Country Oaks Dr., Ft. Myers, Fla. 33912

[21] Appl. No.: 825,569

[22] Filed: Jan. 24, 1992

[51] Int. Cl.$^5$ .............................................. B23P 19/04
[52] U.S. Cl. ........................................ 29/275; 29/270
[58] Field of Search ............ 29/898.07, 898.08, 402.03, 29/402.08, 426.1, 715, 721, 270, 275, 281.1, 283.5, 257, 428, 401.1, 566, 895.1, 402.1, 276; 72/462, 483, 476

[56] References Cited

U.S. PATENT DOCUMENTS

| | | | |
|---|---|---|---|
| 1,996,169 | 4/1935 | Padgett | 29/721 X |
| 2,054,269 | 9/1936 | Reilly | 29/276 X |
| 2,367,630 | 12/1944 | Gilligan | 29/270 X |
| 3,233,402 | 2/1966 | Urbaitis | 29/257 X |
| 3,234,634 | 2/1966 | Johnson et al. | 29/566 X |
| 3,555,648 | 1/1971 | Zebb | 29/402.08 |
| 4,437,220 | 3/1984 | Gregory | 29/898.08 X |

FOREIGN PATENT DOCUMENTS

| | | | |
|---|---|---|---|
| 311712 | 7/1919 | Fed. Rep. of Germany | 29/257 |
| 1049797 | 1/1959 | Fed. Rep. of Germany | 29/257 |

*Primary Examiner*—William Briggs
*Attorney, Agent, or Firm*—Gifford, Groh, Sprinkle, Patmore and Anderson

[57] ABSTRACT

A tool is disclosed for replacing the washer in a planetary gear of the type having a frame, an elongated axle having both ends secured to the frame, a gear rotatably mounted to the axle and in which the washer is disposed around the axle between one end of the gear and the frame. The tool includes a plate having a top surface and a bottom surface. At least one arcuate cut-out is formed in the plate which receives a portion of the frame containing the gear. With the planetary gear positioned within the cut-out, the axle registers with at least one recess formed in the top surface of the plate. Thereafter, an elongated punch drives the axle into the recess thereby exposing the washer and enabling its replacement. Thereafter, the axle is again driven through the replacement washer and the end of the axle is staked to the planetary gear frame thereby completing the repair. Preferably, a raised nub is provided on the top surface of the plate which registers with a lower end of the axle during the staking operation.

20 Claims, 2 Drawing Sheets

TOOLS FOR REPAIRING PLANETARY GEARS

BACKGROUND OF THE INVENTION

I. Field of the Invention

The present invention relates generally to tools and, more particularly, to a tool for repairing a planetary gear system.

II. Description of the Prior Art

Virtually all transmissions for motor vehicles, such as automobiles and trucks, include one or more planetary gear systems. These planetary gear systems typically comprise a frame and two or more planetary gears rotatably mounted to the frame.

Typically, in order to rotatably mount the planetary gears to the frame, an elongated axle has both of its ends attached to the frame and the planetary gear is rotatably mounted to the axle by a number of needle bearings. At least one, and oftentimes two, washers are disposed at each axial end of the planetary gear so that the washers maintain a spacing between the ends of the planetary gear and the frame.

During prolonged use of the planetary gear system, the washers become worn and eventually allow contact between the axial ends of the planetary gear and the frame of the planetary gear system. When this occurs, repair of the transmission is required.

Previously, it has been the practice to simply replace the entire planetary gear system once the washers become worn. However, the cost of the planetary gear systems has increased dramatically in recent years so that repair of the planetary gear system by replacement of the washers has become not only a viable, but desirable, alternative to replacing the entire planetary gear system.

In replacing the washers in the planetary gear system, transmission repairmen typically use a punch to drive one end of the axle away from the frame. However, such repairmen oftentimes drive the axle too far through the planetary gear which not only exposes the needle bearings between the axle and the planetary gear but also, in some cases, allows the needle bearings to become free of the planetary gear system. When this occurs, the needle bearings drop to the floor, become lost and render the repair of the planetary gear system difficult if not altogether impossible.

A still further problem with the previously known practice for repairing planetary gear systems, is that it is difficult to restake or resecure the end of the axle to the frame of the planetary gear system following replacement of the washer. The end is typically stakes to the frame but, in many cases, the transmission repairman merely drives the axle out of the frame when attempting to restake it. This of course, increases both the difficulty and time necessary to repair the planetary gear system.

SUMMARY OF THE PRESENT INVENTION

The present invention provides a kit or a tool for repairing planetary gear systems which overcomes all of the above mentioned disadvantages of the previously known devices.

In brief, the present invention comprises a plate having a top surface and a bottom surface. At least one arcuate cut-out is formed in the plate and this cut-out is adapted to receive a portion of the frame containing the planetary gear.

At least one recess is formed in the top surface of the plate and this recess has a depth of less than the depth of the axle and a cross sectional area greater than the cross sectional area of the axle. Consequently, with the planetary gear system positioned in the cut-out so that the lower end of the axle is in registration with the recess, a punch is then used to drive the axle downwardly into the recess. The recess, however, limits the downward travel of the axle thereby preventing any dislodgement of the needle bearings contained between the planetary gear and the axle. With the axle driven into the recess, however, the washer is exposed so that it can be removed and replaced with a new washer in the desired fashion.

Preferably one or more raised nubs are also formed on the top surface of the plate. After the washer is replaced and the axle driven back to its original position, a lower end of the axle is positioned on the nub. Thereafter, a staking tool is used to stake the top end of the axle to the frame thus reattaching the axle to the frame in the desired fashion. The nub thus insures that the axle is firmly held against axial movement during the staking operation.

Still further improvements of the present invention comprise a novel punch for driving the axle from the planetary system frame as well as stake inserts for facilitating the staking operation with certain types of planetary gear systems.

BRIEF DESCRIPTION OF THE DRAWING

A better understanding of the present invention will be had upon reference to the following detailed description when read in conjunction with the accompanying drawing, wherein the like reference characters refer to like parts throughout the several views, and in which.

DETAILED DESCRIPTION OF A PREFERRED EMBODIMENT OF THE PRESENT INVENTION

Figure 1:
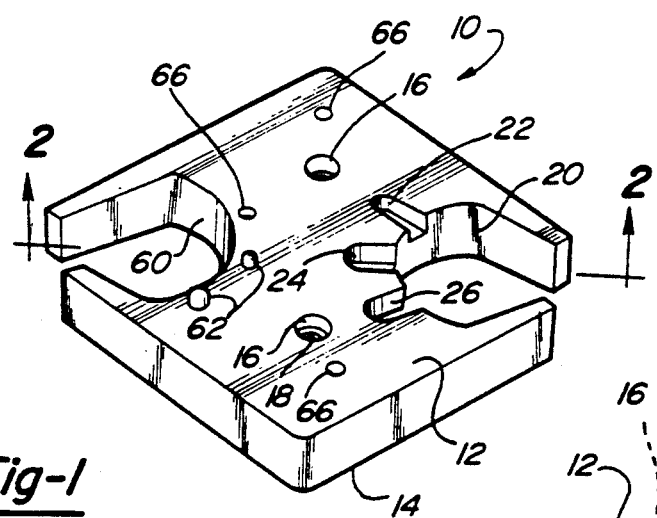
FIG. 1 is a top plan view of one component of the present invention.
Figure 2:
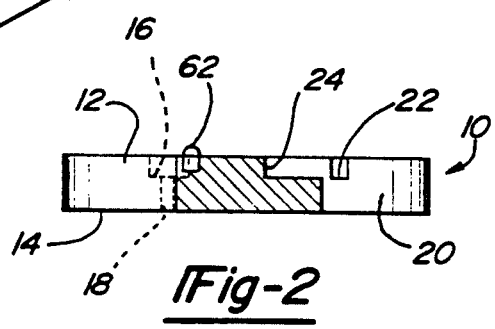
FIG. 2 is an end view taken substantially along line 2—2 in FIG. 1.

With reference first to FIGS. 1 and 2, the present invention comprises a generally flat plate 10 having a top surface 12 and a flat bottom surface 14. A pair of spaced fastener recesses 16 are provided in the top surface of the plate while a through hole 18 extends through each recess 16. A threaded fastener can then extend through the hole 18 to secure the plate 10 to a work support surface and, after doing so, the top surface of the fastener is positioned below the flat top surface 12 of the plate 10.

As best shown in FIG. 1, the plate 10 further includes a first cut-out 20 at one corner of the plate 10. This cut-out 20 is dimensioned to receive a portion of a planetary gear system as will be subsequently described in greater detail.

Still referring to FIG. 1, at least one and preferably several recesses 22, 24 and 26 are provided in the top surface 12 of the plate 10 adjacent the first cut-out 20.

These recesses 22-26 are elongated and each has one end which terminates in the cut-out 20. Furthermore, the width of the recesses 22-24 are preferably different from each other in order to accomodate different planetary gear systems.

Figure 3:
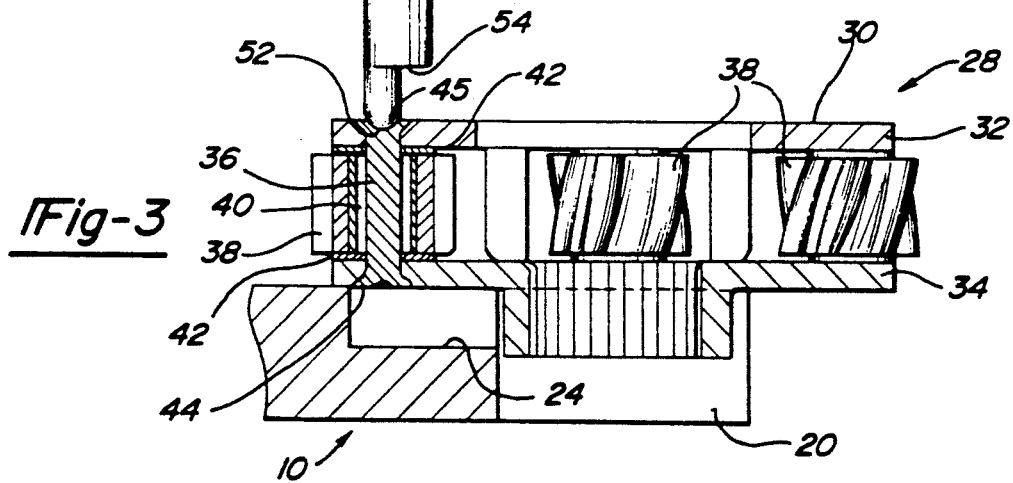
FIG. 3 is a side view illustrating the operation of the preferred embodiment of the present invention.

With reference now to FIG. 3, a portion of a planetary gear system 28 is thereshown having a rigid frame 30 with two spaced apart flanges 32 and 34. An elongated axle 36 extends between the frame flanges 32 and 34 and has each of its ends attached to one of the flanges 32 or 34. Additionally, a planetary gear 38 is rotatably mounted to the shaft 36 by needle bearings 40 while one or more washers 42 are positioned between each end of the planetary gear 38 and its associated flange 32 or 34. These washers 42 thus prevent contact and rubbing between the planetary gear 38 and the frame 30 of the planetary gear system 28. Furthermore, it is these washers 42 which become worn during prolonged use and require replacement which is accomplished by the tool of the present invention.

Figure 4:
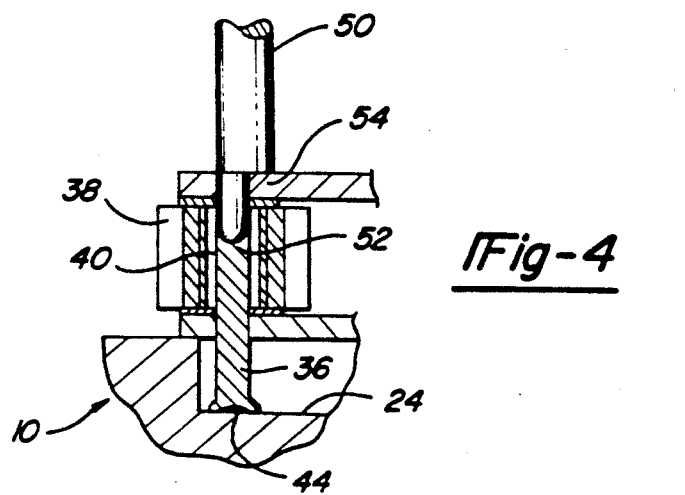
FIG. 4 is a view similar to FIG. 3 but illustrating a further step of one operation of the present invention.

Referring then to FIGS. 2-4, in order to replace the washers 42 of the planetary gear system 28, a portion of the planetary gear system 28 is first positioned within the cut-out 20 of the plate 10 so that a lower end 44 of the axle 36 registers with one of the recesses 22-26. Furthermore, the appropriate recess 22-26 is selected so that the width of the selected recess 22-26 is slightly greater than the diameter of the axle 36.

Referring now particularly to FIGS. 3 and 4, with the lower end 44 of the axle 36 in registration with the selected recess 22-26 in the previously described fashion, an elongated punch 50 having a rounded nose 52 is then positioned against the top of the axle 36. A hammer (not shown) is then used to drive the punch 50 from the position shown in FIG. 3 to the position shown in FIG. 4 in which the lower end 44 of the axle engages the bottom of the selected recess 24. The depth of each of the recesses 22-26 is less than half the length of the axle 42. Furthermore, the depth of the recesses 22-24 is selected so that, when the punch is used to drive the axle to the bottom of the selected recess 24 as shown in FIG. 4, the needle bearings 40 remain entrapped between the axle 36 and the planetary gear 38 while the top of the shaft 36 is positioned below the washer 42. As such, the washer 42 can be easily removed and replaced by a new washer without disturbing the needle bearings 40.

Still referring to FIG. 3 and 4, the punch 50 also preferably includes an outwardly extending flange 54 at a position spaced outwardly from its rounded nose 52 by a distance substantially the same as the depth of the recesses 22-26. When the hammer is used to drive the axle 36 into the recess 24 as shown in FIG. 4, the flange 54 abuts against the top of the planetary gear system frame 30. Thus, the punch flange 54 not only prevents the axle 36 from being driven too far with respect to the gear 38, but also prevents any possible bending of the axle 36 which might occur if the axle 36 were merely driven against the bottom of the recess 24.

With reference now to FIGS. 1 and 2, the plate 10 also includes a second cut-out 60 at the opposed corner to the first cut-out 20. The second cut-out 60 is substantially the same size as the first cut-out 20 and is also adapted to receive a portion of a planetary gear system under repair.

At least one, and preferably several raised nubs 62 protrude upwardly from the top surface 12 of the plate 10 at a position adjacent the second cut-out 60. Each of these raised nubs 62, furthermore, is preferably of a different size in order to accomodate different axles 36 as will be subsequently described.

Figure 5:
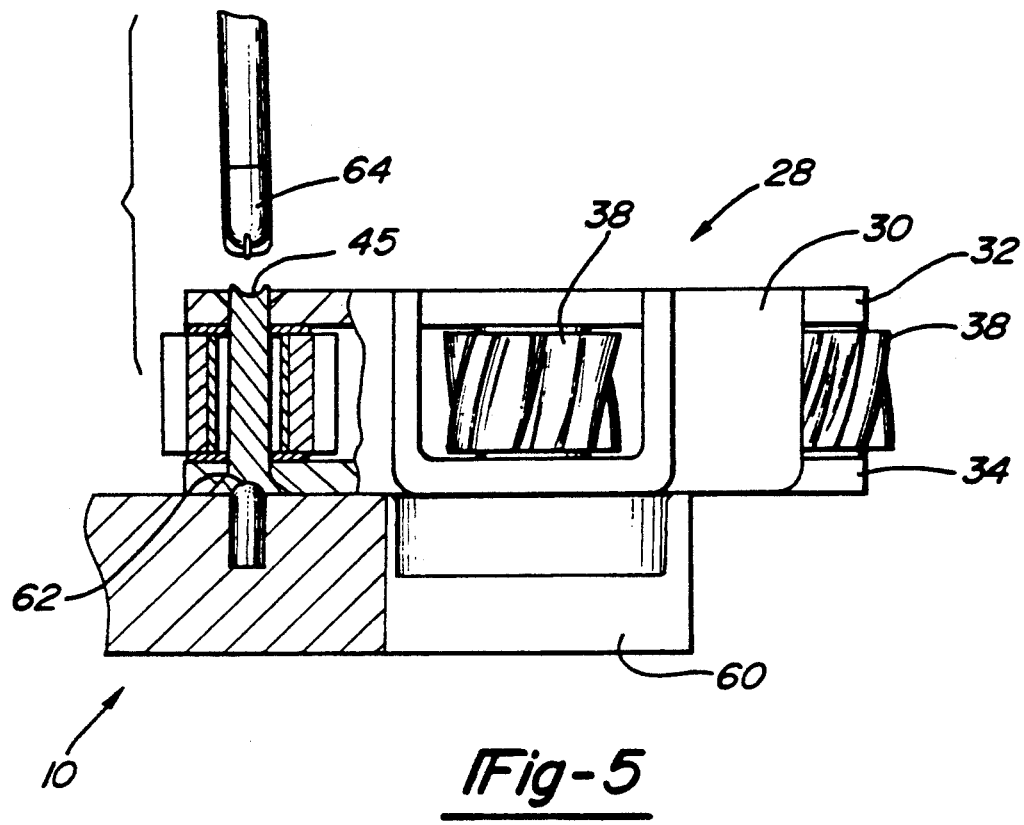
FIG. 5 is a side view illustrating a further operation using the preferred embodiment of the present invention.

Following replacement of the washers 42 in the planetary gear system 28, the axle 36 is redriven to its original position with respect to the frame 30. The, as best shown in FIG. 5, the planetary gear system 28 is positioned within the second cut-out 60 until the lower end 44 of the shaft 36 is positioned on top of the appropriate raised nub 62. Thereafter, an elongated staking tool 64 is used to stake the top 45 of the axle 36 to the frame 30 thereby again securing the axle 36 to the frame 30 in the desired fashion.

Figure 6:
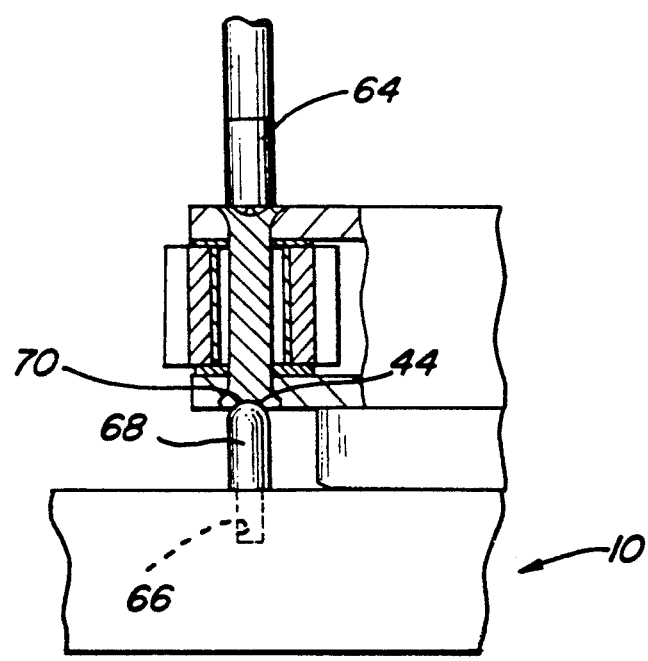
FIG. 6 is a view similar to FIG. 5 but illustrating a modification thereof.

In some cases, because of the design of the planetary gear system 28, it is not possible to abut the lower end 44 of the axle 36 against one of the raised nubs 62. For such situations, the plate preferably includes at least one circular recess 66 (FIG. 1) adjacent the second cut-out 60. As best shown in FIG. 6, an elongated stake insert 68 has its lower end removably positioned within the circular recess 66 so that a top 70 of the stake insert 68 abuts against the lower end 44 of the axle 36. The top end 44 of the axle 36 is then staked to the frame 30 by the staking tool 64 in the previously described fashion.

Preferably, the present invention comprises a plurality of different stake inserts 68, each of which has a different longitudinal length. As such, different stake inserts 68 can be used to accomodate different configurations of the frame 30 for the planetary gear system.

From the foregoing, it can be seen that the present invention provides a simple, inexpensive and yet totally effective tool for replacing washers in planetary gear systems. In particular, the recesses 22-26 of the present invention limit the travel of the axle 36 as it is driven from the frame 30. The recesses 36, together with the punch 50 and its flange 54 thus insures that the washers 42 can be removed and replaced with new washers without disturbing the needle bearings 40.

The raised nubs 62, as well as the stake inserts 68, also facilitate restaking the axle 36 to the frame 34 following replacement of the washer 42. Furthermore, due to the wide variety of the recesses 22-24, the raised nubs 62 and the stake inserts 68, the present invention can be used to replace the washers in planetary gear system for a wide variety of different planetary gear systems.

Having described my invention, however, many modifications thereto will become apparent to those skilled in the art to which it pertains without deviation from the spirit of the invention as defined by the scope of the appended claims.

I claim:

1. For use with a planetary gear system of the type having a frame, an elongated axle having both ends secured to the frame, a gear rotatably mounted to the axle and at least one washer around the axle between one end of the gear and the frame, a tool for replacing the washer comprising:

a plate having a top surface and a bottom surface, at least one arcuate cut-out formed in said plate, said cut-out adapted to receive a portion of the frame containing the gear, at least one recess formed in said top surface of said plate, said recess having a depth less than the length of said axle and a cross sectional area greater than the cross sectional area of said axle, an elongated punch adapted to register with an upper end of the axle so that, with a lower end of the axle in registration with said recess and the punch in registration with the upper end of the axle, the punch is used to drive the axle into the recess to thereby enable removal of the washer, at least one raised nub on the top surface of said plate, said nub adapted to register with a lower end of the axle, and a staking tool for staking the upper end of the axle after replacement of the washer.

2. The invention as defined in claim 1 and comprising at least two recesses formed on the top surface of the plate, each recess being of a different size.

3. The invention as defined in claim 2 wherein each recess is elongated and has one end which terminates at and extends outwardly from the cut-out.

4. The invention as defined in claim 1 and comprising a second cut-out in said plate, said second cut-out adapted to receive a portion of the frame containing the gear and said nub being positioned adjacent said second cut-out so that, with said portion of said frame positioned in said second cut-out, the lower end of the axle registers with the nub.

5. The invention as defined in claim 4 and comprising a plurality of raised nubs adjacent said second cut-out.

6. The invention as defined in claim 1 wherein said punch comprises an elongated body having rounded nose at one end adapted to register with the upper end of the axle, and a flange protruding outwardly from the body at a position spaced from the rounded nose of the body by a distance less than half the length of the axle.

7. The invention as defined in claim 1 wherein said plate includes at least one stake insert hole and further comprising an elongated stake insert having a lower end adapted to be positioned in said hole and a rounded upper end adapted to register with the lower end of the axle.

8. The invention as defined in claim 7 and comprising at least two stake inserts, each stake insert having a different length.

9. The invention as defined in claim 4 wherein said plate is substantially rectangular in shape and wherein said cut-outs are formed on opposite corners of said plate.

10. The invention as defined in claim 1 and comprising at least two fastener recesses formed in the top surface of the plate and a through hole extending through each fastener recess to the bottom surface of said plate.

11. For use in repairing a planetary gear system of the type having a frame, an elongated axle having both ends secured to the frame, a gear rotatably mounted to the axle and at least one washer around the axle between one end of the gear and the frame, a kit for replacing the washer comprising:

a plate having a top surface and a bottom surface, at least one arcuate cut-out formed in said plate, said cut-out adapted to receive a portion of the frame containing the gear, at least one recess formed in said top surface of said plate, said recess having a depth less than the length of said axle and a cross sectional area greater than the cross sectional area of said axle, an elongated punch adapted to register with an upper end of the axle so that, with a lower end of the axle in registration with said recess and the punch in registration with the upper end of the axle, the punch is used to drive the axle into the recess to thereby enable removal of the washer, at least one raised nub on the top surface of said plate, said nub adapted to register with a lower end of the axle, and a stalking tool for staking the upper end of the axle after replacement of the washer.

12. The invention as defined in claim 11 and comprising at least two recesses formed on the top surface of the plate, each recess being of a different size.

13. The invention as defined in claim 12 wherein each recess is elongated and has one end which terminates at and extends outwardly from the cut-out.

14. The invention as defined in claim 11 and comprising a second cut-out in said plate, said second cut-out adapted to receive a portion of the frame containing the gear and said nub being positioned adjacent said second cut-out so that, with said portion of said frame positioned in said second cut-out, the lower end of the axle registers with the nub.

15. The invention as defined in claim 14 and comprising a plurality of raised nubs adjacent said second cut-out.

16. The invention as defined in claim 11 wherein said punch comprises an elongated body having rounded nose at one end adapted to register with the upper end of the axle, and a flange protruding outwardly from the body at a position spaced from the rounded nose of the body by a distance less than half the length of the axle.

17. The invention as defined in claim 11 wherein said plate includes at least one stake insert hole and further comprising an elongated stake insert having a lower end adapted to be positioned in said hole and a rounded upper end adapted to register with the lower end of the axle.

18. The invention as defined in claim 17 and comprising at least two stake inserts, each stake insert having a different length.

19. The invention as defined in claim 14 wherein said plate is substantially rectangular in shape and wherein said cut-outs are formed on opposite corners of said plate.

20. The invention as defined in claim 11 and comprising at least two fastener recesses formed in the top surface of the plate and a through hole extending through each fastener recess to the bottom surface of said plate.

* * * * *